(12) United States Patent
Lane, Jr.

(10) Patent No.: US 8,226,122 B2
(45) Date of Patent: Jul. 24, 2012

(54) THIN LINEAR SEATBELT PRETENSIONER

(75) Inventor: Wendell Chenney Lane, Jr., Romeo, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/945,126

(22) Filed: Nov. 12, 2010

(65) Prior Publication Data
US 2012/0119478 A1  May 17, 2012

(51) Int. Cl.
*B60R 22/46* (2006.01)
(52) U.S. Cl. .......................................... 280/806; 297/480
(58) Field of Classification Search .................... 60/632, 60/635, 636, 637, 638; 180/268, 270, 271; 280/806, 807; 297/479, 480
See application file for complete search history.

(56) References Cited

U.S. PATENT DOCUMENTS

| | | | |
|---|---|---|---|
| 3,891,271 A | 6/1975 | Fieni | 297/386 |
| 3,901,531 A | 8/1975 | Prochazka | 280/150 |
| 4,288,098 A | 9/1981 | Tsuge et al. | 280/806 |
| 4,508,287 A | 4/1985 | Nilsson | 242/107 |
| 4,917,210 A | 4/1990 | Danicek et al. | 180/268 |
| 5,294,150 A * | 3/1994 | Steffens, Jr. | 280/801.2 |
| 5,366,245 A | 11/1994 | Lane, Jr. | 280/806 |
| 5,519,997 A | 5/1996 | Specht | 60/632 |
| 5,588,608 A * | 12/1996 | Imai et al. | 242/374 |
| 5,676,397 A | 10/1997 | Bauer | 280/806 |
| 5,911,440 A | 6/1999 | Ruddick et al. | 280/806 |
| 5,971,488 A | 10/1999 | Pedronno et al. | 297/468 |
| 6,068,664 A | 5/2000 | Meyer et al. | 797/480 |
| 6,149,095 A | 11/2000 | Specht et al. | 242/374 |
| 6,155,512 A | 12/2000 | Specht et al. | 242/374 |
| 6,186,549 B1 | 2/2001 | Specht et al. | 280/806 |
| 6,299,090 B1 | 10/2001 | Specht et al. | 242/374 |
| 6,382,674 B1 | 5/2002 | Specht et al. | 280/806 |
| 6,516,726 B2 | 2/2003 | Specht | 102/530 |
| 6,527,298 B2 | 3/2003 | Kopetzky | |
| 6,527,299 B2 | 3/2003 | Specht et al. | 280/806 |
| 7,188,868 B2 * | 3/2007 | Yamaguchi | 280/806 |

(Continued)

FOREIGN PATENT DOCUMENTS
DE   103 08 121 B3   10/2004
(Continued)

OTHER PUBLICATIONS
U.S. Appl. No. 12/723,151, filed Mar. 12, 2010, Lane, Jr. et al.
(Continued)

*Primary Examiner* — Joseph Rocca
(74) *Attorney, Agent, or Firm* — Sally J. Brown; Brinks Hofer Gilson & Lione

(57) ABSTRACT

A linear pretensioner for use as part of a motor vehicle occupant belt restraint system mountable to vehicle structure and coupled with a belt restraint system component. The pretensioner includes at least one base plate having a slot and at least one closure plate fixedly attached to the base plate. The closure plate(s) and the slot of the base plate(s) form a cavity having an open end. A piston plate has a piston tail slidably disposed within the cavity and a piston head extending from the open end. A cable is coupled with the piston plate, the base plate(s), and/or the closure plate(s). The piston plate, the slot of the base plate(s), and the closure plate(s) cooperate to form an expanding chamber that enlarges when pressurized by a gas generator, which drives the piston plate and the base plate relative to each other to exert tension on the cable.

35 Claims, 9 Drawing Sheets

U.S. PATENT DOCUMENTS

| | | | |
|---|---|---|---|
| 7,350,734 B2 | 4/2008 | Stevens | 242/374 |
| 7,380,832 B2 | 6/2008 | Gray et al. | 280/806 |
| 7,490,857 B2 * | 2/2009 | Tomita | 280/806 |
| 7,644,952 B2 | 1/2010 | Holtz | |
| 2009/0218802 A1 | 9/2009 | Singer et al. | 280/806 |
| 2010/0037610 A1 | 2/2010 | Singer | 280/806 |

FOREIGN PATENT DOCUMENTS

| | | |
|---|---|---|
| EP | 0 625 450 A2 | 11/1994 |
| EP | 0 685 371 B1 | 7/1997 |
| EP | 1 078 827 A2 | 2/2001 |
| FR | 2 721 073 | 12/1995 |
| JP | 11-321559 | 11/1999 |
| WO | WO 02/062632 A1 | 8/2002 |

OTHER PUBLICATIONS

U.S. Appl. No. 12/826,089, filed Jun. 29, 2010, Lane, Jr.

* cited by examiner

THIN LINEAR SEATBELT PRETENSIONER

FIELD OF THE INVENTION

The present invention relates generally to seatbelt restraint systems for motor vehicles, and more particularly, to a linear seatbelt pretensioner for a seatbelt restraint system.

BACKGROUND OF THE INVENTION

Seatbelt restraint systems for restraining an occupant in a vehicle seat play an important role in reducing occupant injury in vehicle crash situations. Seatbelt restraint systems of the conventional so-called "3-point" variety commonly have a lap belt section extending across the seat occupant's pelvis and a shoulder belt section crossing the upper torso, which are fastened together or are formed by a continuous length of seatbelt webbing. The lap and shoulder belt sections are connected to the vehicle structure by anchorages. A belt retractor is typically provided to store belt webbing and may further act to manage belt tension loads in a crash situation.

Seatbelt restraint systems which are manually deployed by the occupant (so-called "active" types) also typically include a buckle attached to the vehicle body structure by an anchorage. A latch plate attached to the belt webbing is received by the buckle to allow the belt system to be fastened for enabling restraint, and unfastened to allow entrance and egress from the vehicle. Seatbelt systems, when deployed, effectively restrain the occupant during a collision.

OEM vehicle manufacturers often provide seatbelt restraint systems with pretensioning devices, which tension the seatbelt either prior to impact of the vehicle (also known as a "pre-pretensioner") or at an early stage of a sensed impact to enhance occupant restraint performance. The pretensioner takes out slack in the webbing and permits the belt restraint system to couple with the occupant early in the crash sequence. Upon the detection of a condition leading to an imminent impact or rollover, or in the event of an actual rollover, seat belt webbing is automatically and forcibly retracted by the pretensioner to tighten the seat belt against the occupant.

One type of pretensioning device is a pyrotechnic linear pretensioner (PLP), which can be implemented as a pyrotechnic buckle pretensioner (PBP) that is attached to a seat belt buckle. PLPs can also be attached to a webbing guide loop or seatbelt anchorage. Since both types pull a seat belt system component linearly to apply tension in the belt webbing, both PLPs and PBPs can be collectively referred to as a PLP. Examples of designs of PLPs and PBPs are provided by U.S. Pat. No. 6,068,664, which is hereby incorporated by reference. Typical PLPs have a pyrotechnic charge that is fired when a collision occurs, producing expanding gas which pressurizes a gas chamber within a tube, which forces a piston down the tube. The piston is connected with the belt system by a cable or strap. Stroking of the piston tightens or "pretensions" the belt against the occupant.

One design challenge with current linear and buckle pretensioners utilizing gas generators is efficient utilization of the gas volume produced by the generator. Typically, a significant volume of the gas produced by the gas generator leaks out of the device. Leak paths may be located around the piston, through the piston, and/or through the piston stroking tube around the opening through which the cable passes. A cable affixed to the piston typically has an uneven shape that is very difficult to seal around. Leaks paths allow gas to leak from the device, decreasing the pressure available for pretensioning the seat belt. Manufacturers have been forced to use larger gas generators to compensate for the loss. Moreover, manufacturing variations and the related lack of control of leakage paths can affect the repeatability of performance of the PLP.

Current PLPs require a fair amount of stroke distance for the piston, which must be able to travel approximately the distance of the webbing length that is desired to be retracted by the pretensioner. Accordingly, the required stroke distance places a constraint on interior vehicle design. Moreover, packaging space is a prime design constraint in incorporating PLPs. Typical PLPs utilize a round cylinder piston arrangement which makes the assembly bulky which limits ease of implementation, such as when it is desired to mount the unit behind interior trim panels or adjacent to vehicle seats.

In addition, the components of many presently available PLP devices are die cast, which compared with many other manufacturing processes, is expensive. Automotive component suppliers constantly seek reductions in costs of their products, and more efficient and less expensive methods of manufacture are desired.

SUMMARY OF THE INVENTION

The present invention provides a PLP that substantially reduces leak paths for gas to escape from the PLP device. The present invention also eliminates the need for the use of expensive die cast components in the PLP, reduces the stroke distance needed for the piston, and reduces the bulk of the assembly.

In one embodiment of the present invention, the pretensioner includes at least one base plate having portions forming a slot and at least one closure plate attached to the base plate(s). The closure plate(s) and the portions of the base plate forming the slot cooperate to form a cavity having a rectangular cross-section and an open end. A piston plate has a piston tail slidably disposed within the cavity and a piston head extending from the open end. A cable is coupled with one or more of the following: the piston plate, the base plate(s), or the closure plate(s). The piston plate, the portions of base plate(s) forming the slot, and the closure plate(s) cooperate to form an expanding chamber that enlarges when pressurized by a gas generator. Upon activation, the gas generator drives the piston plate and the one or more base plates relative to each other in a linear direction to exert tension on the cable, which is coupled to a belt restraint system component.

In another embodiment, the pretensioner includes a base plate having portions forming a slot and first and second guide plates attached to opposite faces of the base plate. The first and second guide plates and the portions of the base plate forming the slot cooperate to form a channel having an open end. A piston plate has a piston tail slidably disposed within the channel and a piston head extending from the open end. A cable is coupled with at least one of the following: the first guide plate, the second guide plate, or the base plate. The cable is further coupled with the belt restraint system component, and the cable is routed around the piston head in slidable contact therewith. The piston plate, the portions of the base plate forming the slot, and the first and second guide plates cooperate to form an expanding chamber that enlarges when pressurized by a gas generator. Upon activation, the gas generator drives the piston plate and the base plate relative to each other in a linear direction to exert tension on the cable. This invention can take other forms, and further embodiments are described herein.

Additional benefits and advantages of the present invention will become apparent to those skilled in the art to which the present invention relates from the subsequent description and the appended claims, taken in conjunction with the accompanying drawings. It should be understood that the description and specific examples are intended for purposes of illustration only and are not intended to limit the scope of this invention.

BRIEF DESCRIPTION OF THE DRAWINGS

The drawings described herein are for illustration purposes only and are not intended to limit the scope of the present disclosure in any way.

FIG. 5 is a cross-sectional view of the pretensioner of FIG. 4, taken along the line 5-5 of FIG. 4;

DETAILED DESCRIPTION OF INVENTION

The following description is merely exemplary in nature and is not intended to limit the present disclosure or its application or uses.

Figure 1:
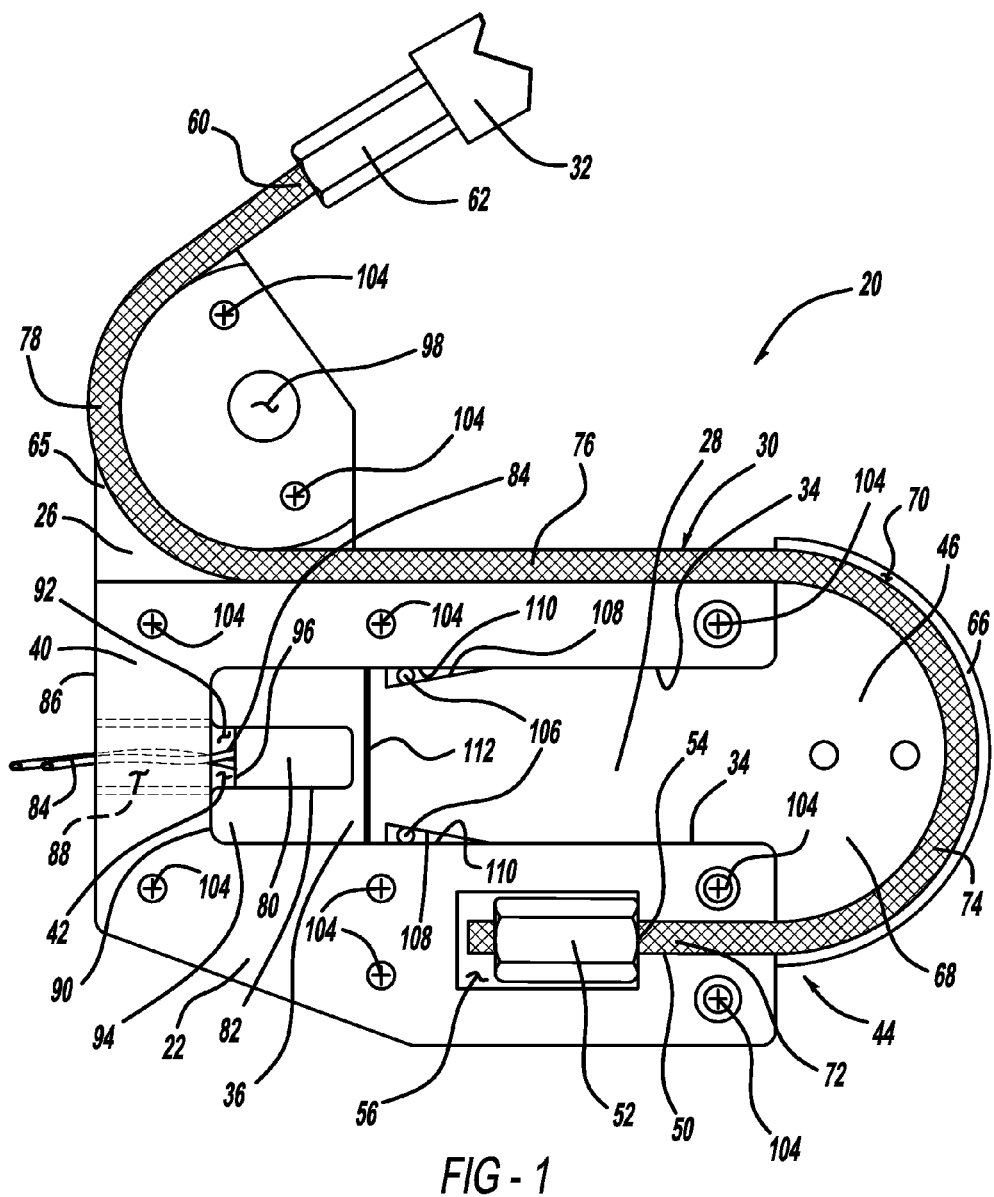
FIG. 1 is a side view of a portion of a pretensioner in accordance with the principles of the present invention having one closure plate removed to reveal internal components.
Figure 2:
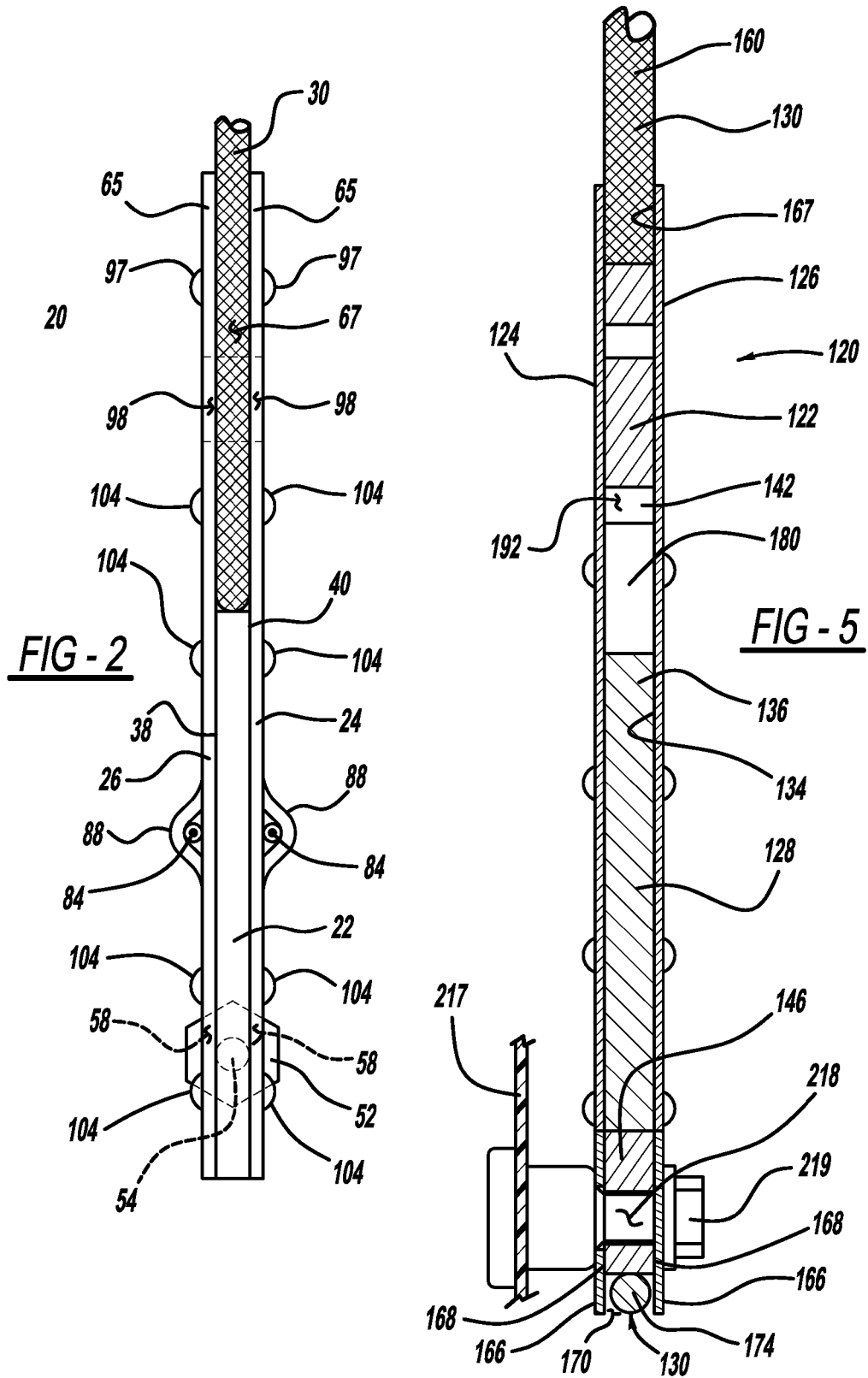
FIG. 2 is an end view of the pretensioner of FIG. 1.
Figure 3:
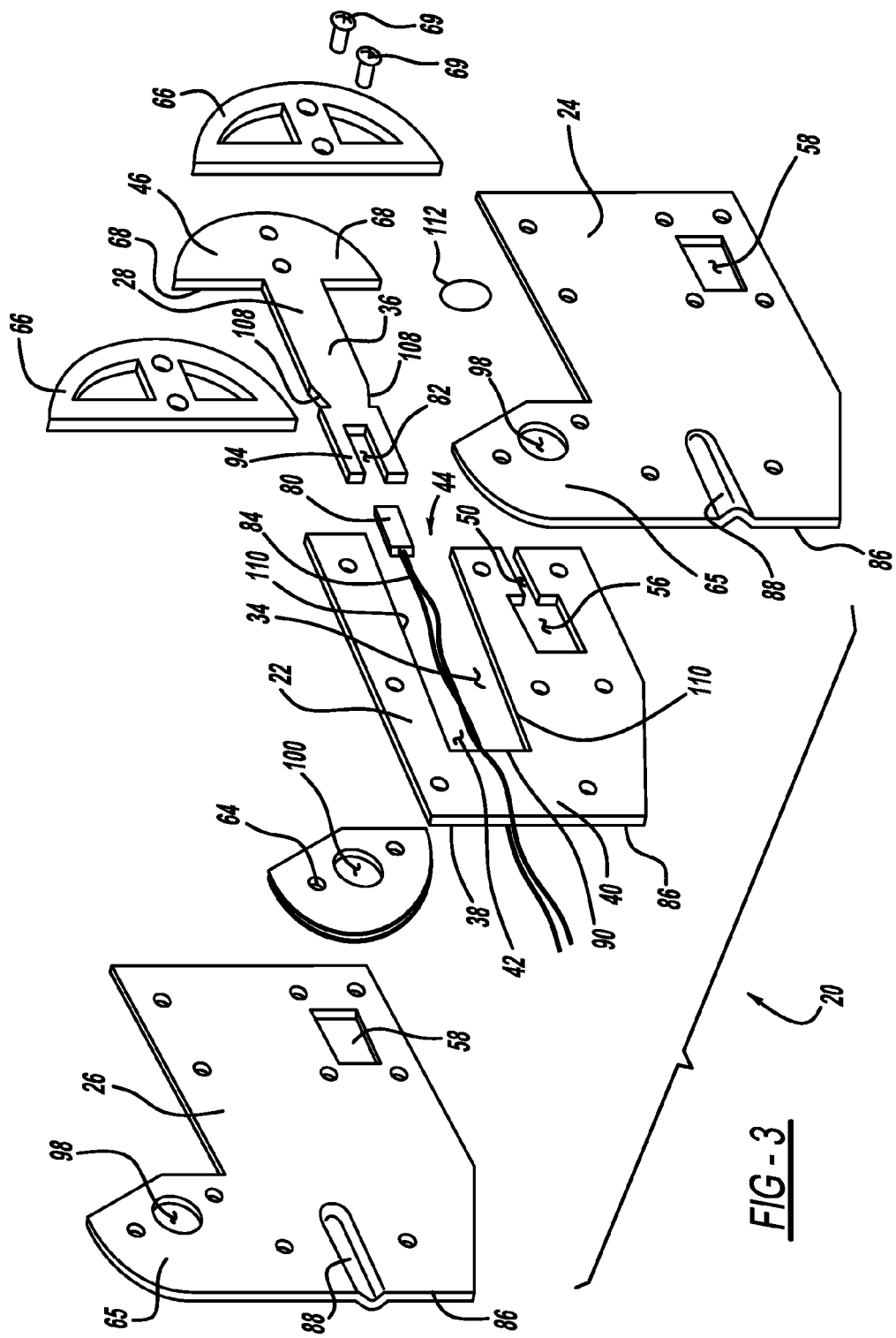
FIG. 3 is an exploded view of a portion of the pretensioner of FIGS. 1 and 2.

Referring now to FIGS. 1-3, a linear pretensioner in accordance with the present invention is illustrated and generally designated by reference number 20. The pretensioner 20 includes a base plate 22, front and back closure plates 24 and 26, a piston plate 28 and a cable 30. In this example, the linear pretensioner 20 is used as part of a motor vehicle occupant belt restraint system of the type mountable to a motor vehicle structure and coupled with a belt restraint system component 32. Each of the base plate 22, the closure plates 24 and 26, and the piston plate 28 is substantially flat, but they may have cut-outs and/or indented portions as described herein.

The base plate 22 has portions forming a slot 34 for receiving the piston tail 36 of the piston plate 28. The piston tail 36 is slidably disposed within the slot 34. The base plate 22 as well as closure plates 24 and 26 are formed from a sheet of sheet metal stock, although it should be understood that these parts could be formed in any other suitable manner or material, without falling beyond the spirit and scope of the present invention. The back closure plate 26 is a guide plate that is fixedly attached the back face 38 of the base plate 22, and the front closure plate 24 is a guide plate that is fixedly attached to the front face 40 of the base plate 22. (In FIG. 1, the front closure plate 24 is removed to show other components). Thus, the front and back closure plates 24 and 26 are attached to opposite faces 38 and 40 of the base plate 22.

The front and back closure plates 24, 26 and the portions of the base plate 22 that form the slot 34 cooperate to form a channel or cavity 42 in which the piston tail 36 is slidably disposed. The channel 42 has an open end 44, and the piston plate 28 has a piston head 46 that extends from the open end 44 of the cavity 42. The walls of cavity 42 slide over the piston tail 36, such that the cavity 42 telescopically overfits the piston tail 36 with a sliding fit. The front and back closure plates 24 and 26 and the base plate 22 form the cavity 42 having a cross-sectional shape which is generally rectangular as shown, with the piston tail 36 forming a rectangular cross-sectional shape which corresponds with the shape of the cavity 42. However, it should be understood that the cavity 42 and piston tail 36 could have shapes other than those shown, without falling beyond the spirit and scope of the present invention. However, in preferred embodiments of this invention, cavity 42, in a section transverse to the direction of movement of piston tail 36, is rectangular, as being formed by the sandwiched or layered components as shown. The rectangular cross-sectional shape is much taller in its height (H) (vertically as the parts are shown in FIG. 1), than its width (W) (the thickness or horizontal measurement as shown in FIG. 2). For example, the height (H) is preferably at least three times the width (W).

The flexible cable 30 is coupled to the base plate 22, the front closure plate 24, and the back closure plate 26. In this example, the cable 30 extends through a narrow passageway 50 in the base plate 22, and the end 54 of the cable 30 is secured to a cable stop 52. The cable stop 52 is larger than the narrow passageway 50 to prevent the cable 30 and cable stop 52 from retracting back through the narrow passageway 50, which retains the cable 30 to the base plate 22 when the front and back closure plates 24 and 26 are attached to the base plate 22. The cable stop 52 prevents the cable 30 from being pulled back through the narrow passageway 50 once the cable stop 52 and the front and back closure plates 24 and 26 are installed. The cable 30 may be secured to the cable stop 52 by crimping or any other suitable means, without falling beyond the spirit and scope of the present invention.

The cable stop 52 resides in a larger passageway 56, which is larger than the narrow passageway 50, within the base plate 22. The front and back closure plates 24 and 26 may have cut-outs 58 to give the cable stop 52 space to extend in front and rear directions from the base plate 22. In the alternative, the front and back closure plates 24 and 26 could merely have indentations to fit the cable stop 52, rather than cut-outs 58, or the cable stop could be sized thinly to have the same depth as the base plate 22 such that no cut-outs 58 would be necessary because the cable stop 52 could be flush with the front and back faces 38 and 40 of the base plate 22.

It should be understood that the narrow passageway 50 and cable stop 52 are merely one example of a means for securing the cable 30 to the base plate 22. Alternative means for fastening the cable 30 to the base plate 22 could be used without falling beyond the spirit and scope of the present invention. For example, the cable 30 could be fastened or secured to the base plate 22 or one of the closure plates 24 and 26 by adhesive, crimping, knotting, of any other suitable means.

At its other end 60, the cable 30 is secured to the belt restraint component 32. A second cable stop 62 could be used to attach the cable 30 to the belt restraint component 32. The cable 30 extends from the large passageway 56 of the base plate 22, around the semi-circular shaped piston head 46, further around a guide feature 64 and to the belt restraint component 42.

When the pretensioner 22 is installed into position within a vehicle, the cable 30 is in slidable contact with the piston head 46. A pair of cable guides 66 are disposed on opposite sides 68, or opposite faces, of the piston head 46. The pair of cable guides 66 form a channel 70 therebetween, and the cable 30 is disposed within the channel 70. (In FIG. 1, the front cable guide 66 has been removed to show the back cable guide 66, the cable 30, and the channel 70). In other words, the radii of the semi-circular cable guides 66 are larger than the radius of the semi-circular piston head 46, so that the cable guides 66 form a channel 70 when they are fastened to the piston head 46. The cable guides 66 may be fastened to the piston head 46 using screws, rivets, or other fasteners 69, by way of example. In the alternative, the cable guides 66 may be attached to the piston head 46 in any other suitable manner, such as by spot welding.

Thus, the cable 30 has a distal end portion 72 that is coupled to the base plate 22. The distal end portion 72 is routed generally parallel to the piston tail 36 of the piston plate 28, the slot 34, and the cavity 42 formed by the slot 34 and closure plates 24 and 26. An intermediate portion 74 of the cable 30 is connected to the distal end portion 72. The intermediate portion 74 is routed around the semi-circular piston head 46 180° within the channel 70 between the cable guides 66. The cable 30 has a proximal end portion 76 that is connected to the intermediate portion 74. The proximal end portion 76 is routed generally parallel to the piston tail 36 of the piston plate 28, the slot 34, the cavity 42 formed by the slot 34 and the closure plates 24 and 26, and the distal end portion 72. The proximal end portion 76 is connected to a restraint portion 78 of the cable 30. The restraint portion 78 is routed around the guide feature 64 and coupled with the belt restraint system component 32.

The guide feature 64 may be a round extension or portion of one of the cantilevered guides 65 extending from the front and back closure plates 24 and 26. The guide feature 64 may be attached to or formed with one of the front and back closure plates 24 and 26, or it may simply be sandwiched between the front and back closure plates and held into position by force when the closure plates are fixedly attached to the base plate 22.

The guide feature 64 may be provided as a single guide feature 64 that extends between the cantilevered guides 65 of the front and back closure plates 24, 26. For example, the guide feature 64 may be a stationary pulley or a non-stationary pulley, by way of example, and it may form an outer perimeter groove for guiding the cable 30. The guide feature 64 contacts and guide the cable 30 around an arc for application in the vehicle, but it should be understood that the guide feature 64 could have various shapes, and not all vehicle applications require the cable 30 to be routed around a guide feature 64.

In the illustrated embodiment, the guide feature 64 cooperates with the front and back closure plates 24 and 26 to form a channel 67 through which the cable 30 is routed. The cable 30 extends through the channel 67 from the piston head 46 to the cable stop 62 and belt restraint system component 32.

Once installed into position, the cable 28 will remain tightly wrapped around the guide plates 66 of the piston head 46, and will slide along the guide feature 64 and the piston head 46 when the pretensioner is activated, if the guide feature 64 is stationary. If the guide feature 64 is provided as a movable pulley, then the pulley will roll with the cable 30 against it when the pretensioner 20 is actuated.

The pretensioner 20 includes a gas generator 80 in fluid communication with the cavity 42. In this example, the piston tail 36 forms a recess 82 in which the gas generator 80 is disposed. The recess 82 and gas generator 80 are disposed entirely within the cavity 42. The recess 82 is located in the piston tail 36 opposite the piston head 46. Firing lines 84 (electrical conductors) extend from the gas generator 80 and through a rear side 86 of the pretensioner 20. The firing lines 84 may be sized long enough to extend to the gas generator after actuation, or they may be sized to break upon actuation.

In this example, the front and back closure plates 24 and 26 include wire reliefs, such as indentations 88, to give the firing lines 84 clearance to pass through the pretensioner 20 and through the rear side 86. Excess space in the indentations 88 may be blocked with a suitable compound to prevent gas from leaking from the indentations 88. For example, a flowable sealing material such as an epoxy may be applied to the insides of the indentations to seal the air space around the firing lines 84. In one example, the suitable compound could be provided as molded elastomer to seal around the firing lines 84, which could be compressed into position upon assembly.

As an alternative to having wire reliefs, such as indentations 88, located in the front and back closure plates 24 and 26, the base plate 22 could have a channel extending to the 86, through which the firing lines 84 could extend. In this embodiment, the base plate 22 could be formed of two pieces; a top and bottom base plate. The excess space in the channel could be sealed with a suitable compound, as described above.

The cavity 42 and the piston tail 36 form an expanding chamber 92 that enlarges when pressurized by the gas generator 80. In other words, the piston tail 36 of the piston plate 28, the portions of the base plate 22 that form the slot 34, and the front and back closure plates 24 and 26 cooperate to form the expanding chamber 92. Upon activation, the gas generator 80 pressurizes the expanding chamber 92, which causes it to expand and drive the piston plate 28 and the base plate 22 relative to each other in a linear direction. When the gas generator 80 drives the piston plate 28 with respect to the base plate 22, the cable 30 slides around the piston head 46 and around the guide feature 64, and tension is exerted on the cable 30. The belt restraint system component 32 is pulled and the seat belt restraint system is pretensioned, reducing slack from the seat belt so that the occupant of the vehicle wearing the seat belt is well coupled to the seat belt.

In one example, the gas generator 80 may deliver gas to the expanding chamber 92 as shown in FIG. 1. The gas generator 80 is retained within the recess 82 within the piston tail 36 at a proximal end 94 of the piston tail 36 and in fluid communication with the expanding chamber 92. The gas generator 80 may be retained by a retaining feature, such as a snap ring, staking, or crimping, or it may be retained by any other suitable features or flanges (not shown), by way of example.

It should be understood that the placement of the gas generator 80 is not limited to the configuration described above. For example, the gas generator 80 could be installed within the base plate 22 or otherwise attached to the base plate 22 or closure plate(s) 24 and 26 in any suitable manner, so long as the gas generator 80 is in fluid communication with the cavity 42. In one alternative example, the gas generator 80 could be located in the base plate 22 at the rear side 90 of the slot 34. In such an embodiment, the base plate 22 could be formed of two pieces, a top and bottom piece, each of which could contact top and bottom sides of the gas generator 80. A rear side of the gas generator 80 could be flush with the rear side 86 of the pretensioner, or extend beyond the rear side 86, or be open to the rear side 86, such that the firing lines 84 could merely extend away from the pretensioner 20 without the need for indentations 88 or suitable compound in the front and back closure plates 24 and 26.

The gas generator 80 may be a micro gas generator that is used to pyrotechnically produce an expanding gas in response to a firing signal carried by the firing lines 84. More particularly, when an electrical signal is sent to the gas generator 80, pyrotechnic material is ignited with the gas generator 80, which produces gas that bursts a weak or thin portion 96 of the gas generator 80 upon pressurization of the inside of the gas generator 80. Once the thin portion 96 is burst, the gas escapes from the gas generator 80 and into the expanding chamber 92. Other types of gas generators could be used for example, it is possible to use compressed gas or "cold" inflators in place of a pyrotechnic device, or a hybrid type. The gas generator 80 is preferably a small, flat component that fits within the rectangular-shaped recess 82, and that also fits between the front and back closure plates 24 and 26.

In one form, the base plate 22 and closure plates 24 and 26 are adapted to be fixed to the motor vehicle structure and remain stationary upon deployment of the gas generator 80. For example, the closure plates 24 and 26, to which the base plate 22 is attached, may be fixed to the vehicle structure using a fastener 97 inserted through bores 98 and/or flanges formed within the closure plates 24 and 26, or by any other suitable means, as one having ordinary skill in the art would understand. In the illustrated form, the guide feature 64 also has a bore 100 through which the fastener 97 may extend to attach the pretensioner to the motor vehicle structure. However, it should be understand that the closure plates 24 and 26 and base plate 22 may be fixed to the vehicle in any other suitable way, without falling beyond the spirit and scope of the present invention.

When the base plate 22 and closure plates 24 and 26 are fixed to motor vehicle structure, the piston tail 36 of the piston plate 28 is configured to advance within the expanding chamber 92 upon activation of the gas generator 80, while the front and back closure plates 24 and 26 and the base plate 22 remain stationary. This causes the piston head 46 to push the intermediate portion 74 of the cable 30 outward and the cable 30 to slide around the piston head 46. The parallel distal end portion 72 and proximal end portion 76 of the cable 30 each advance upon actuation of the gas generator 80. As such, when the piston tail 36 travels a distance X within the cavity 42, the restraint portion 78 of the cable 30 and the belt restraint system component 32 are displaced a distance 2X, or in other words, they are displaced twice as far as the piston 28 moves. The result is two units of pretensioning for each one unit of piston travel. For example, 50 mm of piston travel pretensions the buckle head or seat belt webbing 100 mm. This allows for a relatively short pretensioner design, and the space needed for piston travel is half of what is needed when the cable is attached directly to the piston.

In another form, the piston plate 28 is adapted to be fixed to the motor vehicle structure and remain stationary upon deployment of the gas generator 80. For example, the piston plate 28 may be fixed to the vehicle structure using a fastener, or any other suitable method, similar to the fastener inserted through the bores 98 and/or flanges formed within the closure plates 24, 26 described above.

When the piston plate 28 is fixed to motor vehicle structure, the front and back closure plates 24 and 26 and the base plate 22 are driven along the piston tail 36 of the piston plate 28 upon activation of the gas generator 80, while the piston plate 28 remains stationary. This causes the base plate 22 and closure plates 24 and 26 to pull the cable 30 in a sliding motion around the piston head 46. The parallel distal end portion 72 and proximal end portion 76 of the cable 30 each advance. As in the prior embodiment, when the base plate 22 and closure plates 24 and 26 travel along the piston tail 36, the restraint portion 78 of the cable 30 and the belt restraint system component 32 are displaced twice as far. As described above, this allows for a relatively short pretensioner design, and the space needed for piston travel is half of what is needed when the cable is attached directly to the piston.

It should be understood that the cable 30 could be connected to the pretensioner 20 in other ways, without falling beyond the spirit and scope of the present invention. For example, the cable 30 could be connected directly to the piston plate 28, and upon relative displacement of the piston plate 28 and the base plate 22, the cable 30 would be pulled around the guide feature 64 to pretension the cable 30 and the belt restraint system component 32.

The cable 30 is located entirely outside of the expanding chamber 92. The cable 30 remains free from contact with the piston tail 36 and the gas generator 80; it is secured to the cable stop 52 which is located outside of the expanding chamber 92, the cavity 42, and the slot 34 of the base plate 22. Therefore, the linear pretensioner 20 remains free of leak paths adjacent the cable 30.

The closure plates 24 and 26, the base plate 22, and the piston plate 28 may be formed of sheet metal stock, such as aluminum, steel, or any other suitable material of sheet metal stock. For example, the closure plates 24, 26, base plate 22, and piston plate 28 could be formed by blanking sheet metal to create their perimeter shapes and cut-out portions. They could alternatively be formed by a die cast process or any other suitable means.

The closure plates 24 and 26 and base plate 22 could be fixedly attached to each other by seam welding, fasteners 104, or they could be attached together in any other suitable manner. For example, the sheet metal parts could be joined together using toggle lock deformation.

The pretensioner 20 may be provided with means for preventing the piston tail 36 or the base plate 22 from moving in a reverse direction after actuation. For this function, a pair of balls 106 is loaded into position within triangular cut-outs 108 in the piston tail 36. The balls 106 are located between the triangular cut-outs 108 on the outer sides of the piston tail 36 and an inner surface 110 of the slot 34.

In the embodiment wherein the piston plate 28 is driven in the right-hand direction during actuation (as the orientation of the pretensioner 20 is shown in FIG. 1), forces urging the piston plate 28 to move in the left-hand direction would cause the balls 106 to become jammed or wedged between the edges of the triangular cut-outs 108 on the piston tail 36 and the inner surface 110 of the slot 34 of the base plate 22. This acts as a "one-way clutch" preventing "backdriving" of pretensioner 20 after it is actuated. In other words, the one-way clutch is disposed within the cavity 42 and is configured to permit movement of the piston tail 36 within the cavity 42 in an outward direction while preventing movement of the piston tail 36 in an opposed direction.

Likewise, in the embodiment wherein the piston plate 28 is held stationary, and the base plate 22 and closure plates 24 and 26 are driven in the left-hand direction during actuation (as the orientation of the pretensioner 20 is shown in FIG. 1), forces urging the base plate 22 and closure plates 24 and 26 to move in the right-hand direction would cause the balls 106 to become jammed or wedged between the edges of the triangular cut-outs 108 on the piston tail 36 and the inner surface 110 of the slot 34 of the base plate 22, resulting in a "one-way clutch" preventing "backdriving" of pretensioner 20 after it is actuated.

One or more seals 112 for gas retention may be positioned around the exterior side of the piston tail 36, located between the piston tail 36 and the inner surface 110 of the slot 34 of the base plate 22. The seals 112 wrap around the piston tail 36 such that they are also located between the piston tail 36 and the inner faces of the closure plates 24 and 26. As used herein, the inner faces of the closure plates 24 and 26 are the faces that contact the front and back faces 38 and 40 of the base plate 22. These seals 112 seal the expanding chamber 92 and substantially prevent gas from leaking out of the open end 44 of the cavity 42.

When the motor vehicle occupant restraint system calls for actuation of the pretensioner 20, a firing signal is sent to gas generator 80 which pyrotechnically generates a rapidly expanding gas that pressurizes the expanding chamber 92 between the proximal end 94 of the piston tail 36 and within the cavity 42 formed by the slot 34 of the base plate 22 and the closure plates 24 and 26.

In the embodiment in which the base plate 22 and closure plates 24 and 26 are fixed to motor vehicle structure, the actuation of the gas generator 80 forces the piston plate 28 to move axially in the right-hand direction to stroke within the cavity 42. The length of cable 30 may be chosen such that the piston plate 28 will not stroke so far as to allow the piston tail 36 to escape from the cavity 42 after actuation, or other mechanical features can be provided to limit the maximum stroke of the piston tail 36, such as putting a bead or other feature along the length of cable 30 that will stop the cable 30 from advancing once the bead strikes the guide feature 64, or putting in any other suitable stop feature to limit the stroke length. A trim plate or other cover may be provided over the open space in which the piston plate 28 will advance (on the right-hand side of the pretensioner 20 in the orientation of FIG. 1).

In the embodiment in which the piston plate 28 is fixed to motor vehicle structure, the actuation of the gas generator 80 forces the base plate 22 and closure plates 24 and 26 to move axially in the left-hand direction to stroke along the piston tail 36. The length of cable 30 may be chosen such that the base plate 22 and closure plates 24 and 26 will not stroke so far as to allow the piston tail 36 to escape from the cavity 42 after actuation, or other mechanical features can be provided to limit the maximum stroke of the piston tail 36, such as those described above. A trim plate or other cover may be provided over the open space in which the base plate 22 and closure plates 24 and 26 will advance (on the left-hand side of the pretensioner 20 in the orientation of FIG. 1).

Forcible motion of the piston plate 28 and the base plate 22 relative to each other pulls the cable 30 around the piston head 46 and the guide feature 64, which pulls on belt restraint system component 32, which tightens the seat belt. This action provides the pretensioning displacement for the belt system, desired for enhancing belt restraint system performance.

Figure 4:
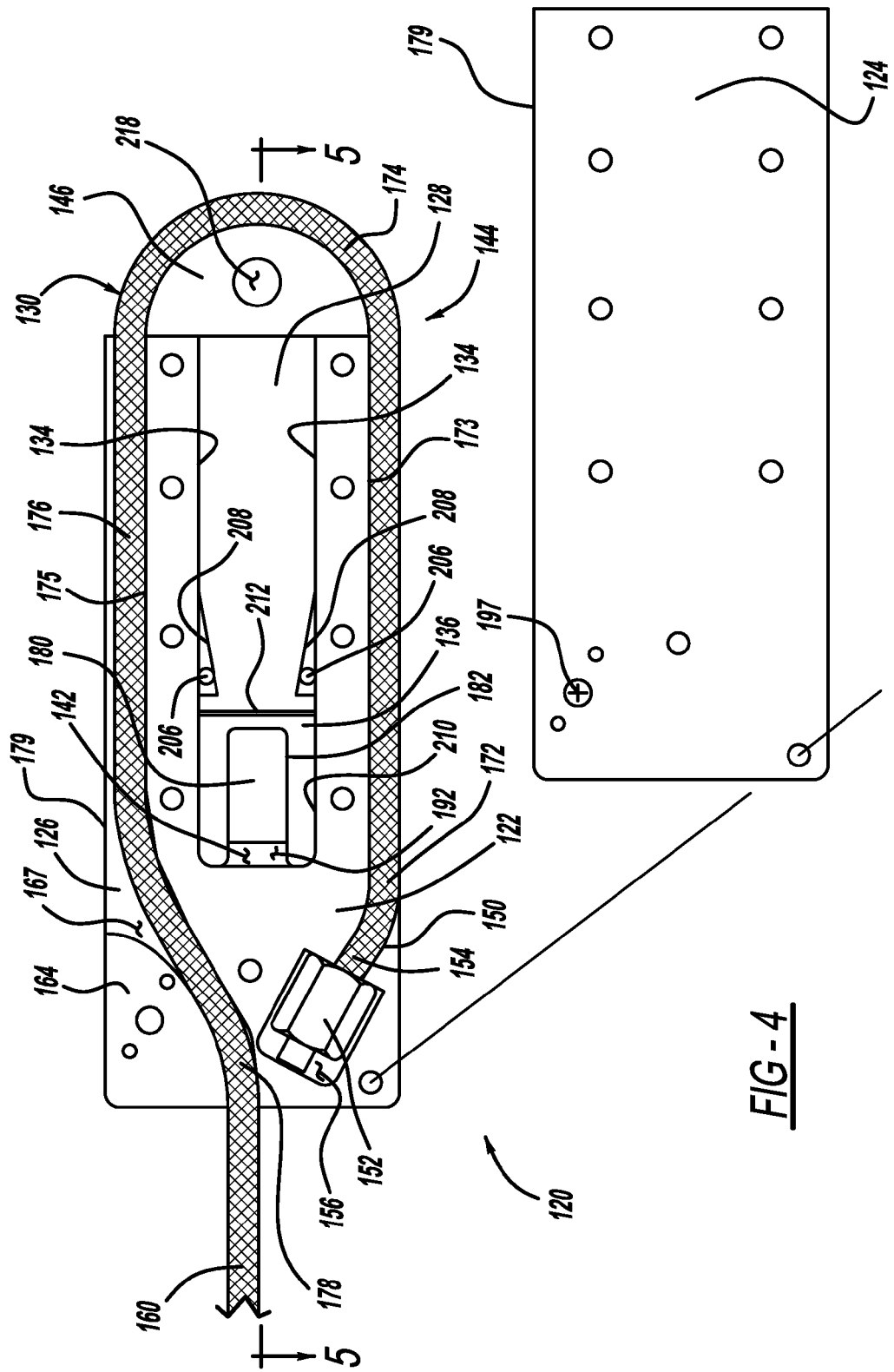
FIG. 4 is a partially exploded view of a second embodiment of a pretensioner according to the principles of the present invention.
Figure 6:
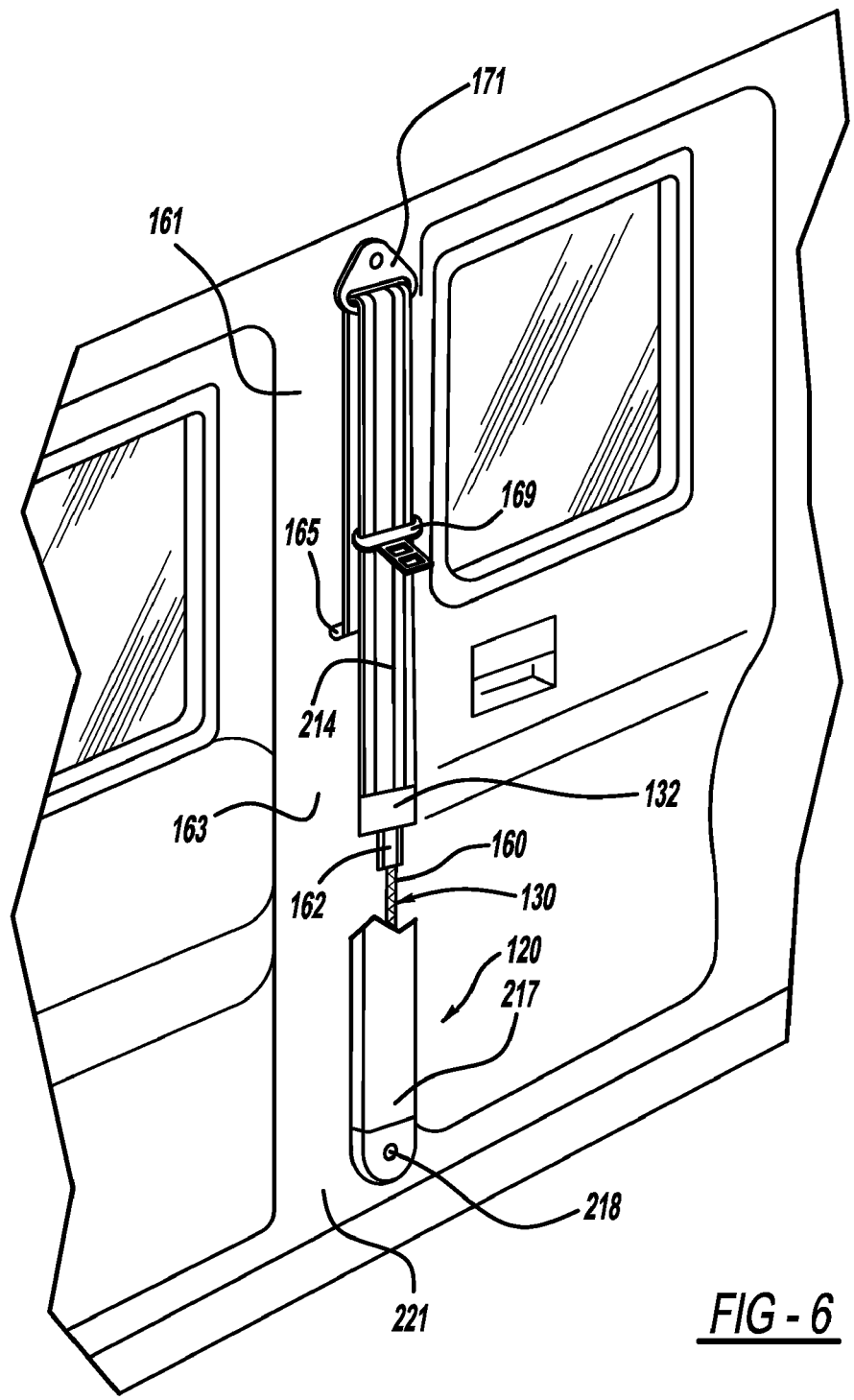
FIG. 6 is a perspective view of the pretensioner of FIGS. 4 and 5, according to the principles of the present invention installed in an automotive interior, with the pretensioner covered by a partially cut-away trim panel.

With reference now to FIGS. 4-6, another embodiment of a pretensioner in accordance with this invention is illustrated at 120. Like the pretensioner of FIGS. 1-3, the pretensioner 120 shown in FIGS. 4-6 has a base plate 122, front and back closure plates 124 and 126, a piston plate 128, and a cable 130. The pretensioner 120 is substantially similar to the pretensioner of FIGS. 1-3, and the description with respect to those figures is herein incorporated by reference, except to the extent that differences are specifically described. For example, the piston plate 128 has a piston head 146 and a piston tail 136, and the front and back closure plates 124 and 126 are attached to the base plate 122 and cooperate with a slot 134 formed in the base plate 122 to form a channel or cavity 142 that telescopically overfits the piston tail 136. The cavity 142 has an open end 144, and the piston head 146 extends from the open end 144 of the cavity 142. In this embodiment, the piston plate 128 is shown having separate pieces for the piston head 146 and the piston tail 136.

Similar to the pretensioner 20 of FIGS. 1-3, the pretensioner 120 of FIGS. 4-6 has a flexible cable 130 coupled to the base plate 122, the front closure plate 124, and the back closure plate 126. The cable 130 extends through a narrow passageway 150 in the base plate 122, and the end 154 of the cable 130 is secured to a cable stop 152. The cable stop 152 is larger than the narrow passageway 150 to prevent the cable 130 and cable stop 152 from retracting back through the narrow passageway 150, which retains the cable 130 to the base plate 122 when the front and back closure plates 124 and 126 are attached to the base plate 122. The cable stop 152 resides in a larger passageway 156, which is larger than the narrow passageway 50, within the base plate 122. The front and back closure plates 124 and 126 may have cut-outs or indentations (not shown) to give the cable stop 152 space to extend in front and rear directions from the base plate 122, or the cable stop 152 could be sized thinly to have the same depth as the base plate 122.

At its other end 160, the cable 130 is secured to the belt restraint component 132. Another cable stop 162 could be used to attach the cable 130 to the belt restraint component 132. The cable 130 extends from the large passageway 156 of the base plate 122, around the semi-circular shaped piston head 146, further around a guide feature 164 and to the belt restraint component 132. When the pretensioner 120 is installed into position within a vehicle, the cable 130 is in slidable contact with the piston head 146. A pair of cable guides 166 are disposed on opposite sides 168, or opposite faces, of the piston head 146. The pair of cable guides 166 form a channel 170 therebetween, and the cable 130 is disposed within the channel 170. (See FIG. 5; in FIG. 4, the cable guides 166 are not shown so that other parts may be seen).

A distal end portion 172 of the cable 130 is coupled to the base plate 122. In this embodiment, part of the distal end portion 172 is routed generally parallel to the piston tail 136 of the piston plate 128, the slot 134, and the cavity 142 formed by the slot 134 and closure plates 124 and 126. Part of the distal end portion 172 is in slidable contact with a first side 173 of the base plate 122. The first side 173 is also parallel to the piston tail 136 and cavity 142.

An intermediate portion 174 of the cable 130 is connected to the distal end portion 172, and the intermediate portion 174 is routed around the semi-circular piston head 14 6180° within the channel 170 between the cable guides 166.

A proximal end portion 176 of the cable 130 is connected to the intermediate portion 174. The proximal end portion 176 is routed generally parallel to the piston tail 136 of the piston plate 128, the slot 134, the cavity 142, and the distal end portion 172. The proximal end portion 176 is in slidable contact with a second side 175 of the base plate 122. The second side 175 is also parallel to the piston tail 136, the cavity 142, the first side 173, and the proximal end portion 172 of the cable 130.

The proximal end portion 176 is connected to a restraint portion 178 of the cable 130. The restraint portion 178 is routed around the guide feature 164 and coupled with the belt restraint system component 132. The guide feature 164 may be similar to the guide feature 64 described above. In this embodiment, the guide feature 164 is located flush with straight side edges 179 of the front and back closure plates 124 and 126. The guide feature 164 may be fastened to the front and back closure plates 124 and 126 with a fastener 197. The guide feature 164 cooperates with the front and back closure plates 124 and 126 and the base plate 122 to form a channel 167 through which the cable 130 is routed. The cable 130 extends through the channel 167 from the second side 175 to the cable stop 162 and belt restraint system component 132.

The pretensioner 120 may further include a gas generator 180 in fluid communication with the cavity 142, as described above with respect to FIGS. 1-3. Firing lines (not shown) extend from the gas generator 180, and they may be routed in any suitable manner, such as those described above. For example, the pretensioner 120 could have wire reliefs, such as the indentations 88 described above. It should be understood that the gas generator 180 could alternatively be located, such as in the base plate 122. The gas generator 180 is preferably a small, flat component that fits within the rectangular-shaped recess 182 in the piston tail 136.

The cavity 142 and the piston tail 136 form an expanding chamber 192 that enlarges when pressurized by the gas generator 180. Upon activation, the gas generator 180 pressurizes the expanding chamber 192, which causes it to expand and drive the piston plate 128 and the base plate 122 relative to each other in a linear direction. When the gas generator 180 drives the piston plate 128 with respect to the base plate 122, the cable 130 slides around the piston head 146 and around the guide feature 164, and tension is exerted on the cable 130. The belt restraint system component 132 is pulled and the seat belt restraint system is pretensioned.

In this embodiment, the piston plate 128 is adapted to be fixed to the motor vehicle structure, for example, through a bore 218, and remain stationary upon deployment of the gas generator 180. A fastener 219 may extend through the bore 219, which may serve to hold the guide plates 166 on the piston head 146, fasten a protective sleeve or shroud 217 over the pretensioner 120, and fix the pretensioner to vehicle structure 221.

When the piston plate 128 is fixed to motor vehicle structure, the front and back closure plates 124 and 126 and the base plate 122 are driven along the piston tail 136 of the piston plate 128 upon activation of the gas generator 180, while the piston plate 128 remains stationary. This causes the base plate 122 and closure plates 124 and 126 to move in an upward direction in the orientation of FIG. 6 and pull the cable 130 in a sliding motion around the piston head 146. The parallel distal end portion 172 and proximal end portion 176 of the cable 130 each advance upon actuation of the gas generator 180. As such, as in the prior embodiments, when the base plate 122 and closure plates 124 and 126 travel along the piston tail 136, the restraint portion 178 of the cable 130 and the belt restraint system component 132 are displaced twice as far as the base plate 122 and closure plates 124 and 126 move.

As described above with respect to FIGS. 1-3, the pretensioner 120 may be provided with a one-way clutch to prevent the base plate 122 from moving in a reverse direction after actuation, which may include a pair of balls 206 loaded into position within triangular cut-outs 208 in the piston tail 136. In addition, one or more seals 212 for gas retention are positioned around the exterior side of the piston tail 136, as described above.

The pretensioner 120 of FIGS. 4-6 is packaged to be narrow and thin enabling it to fit along a pillar, such as a B-pillar, of an automobile (best shown in FIG. 6). Accordingly, the pretensioner 120 may be sized to have the same width as the seat belt webbing 214, or it could be sized to have a width that is not more than twice the width of the seat belt webbing 214. In other words, the width of the pretensioner 120 may be defined by the base plate 122, the front and back closure plates 124 and 126, the piston plate 128, and the cable 130, which could be sized not to exceed the width of the seat belt webbing 214, or sized not to exceed twice the width of the seat belt webbing 214. In some embodiments, the pretensioner 120 width could also be defined by the guide feature 164, in addition to the components described above, and still be sized not to exceed the width of the seat belt webbing 214 or not to exceed twice the width of the seat belt webbing 214.

As shown in FIG. 6, pretensioner 120 (or the other embodiments described) can be mounted to a vehicle B-pillar 161 and enclosed by shroud 217. A seat belt retractor (not shown) is hidden behind trim panel 163. One end of belt webbing 214 is affixed to a spool of the retractor which allows retraction and protraction of the webbing as is commonly provided, with the other webbing end attached to cable 130. The webbing 214 emerges from the retractor, and is routed through trim panel slot 165, upward through D-ring 171, and downward to its attachment to cable 130. A latch plate 169 is positioned at a location on the webbing where it is conveniently accessed by a vehicle occupant for donning the seat belt.

Figure 7:
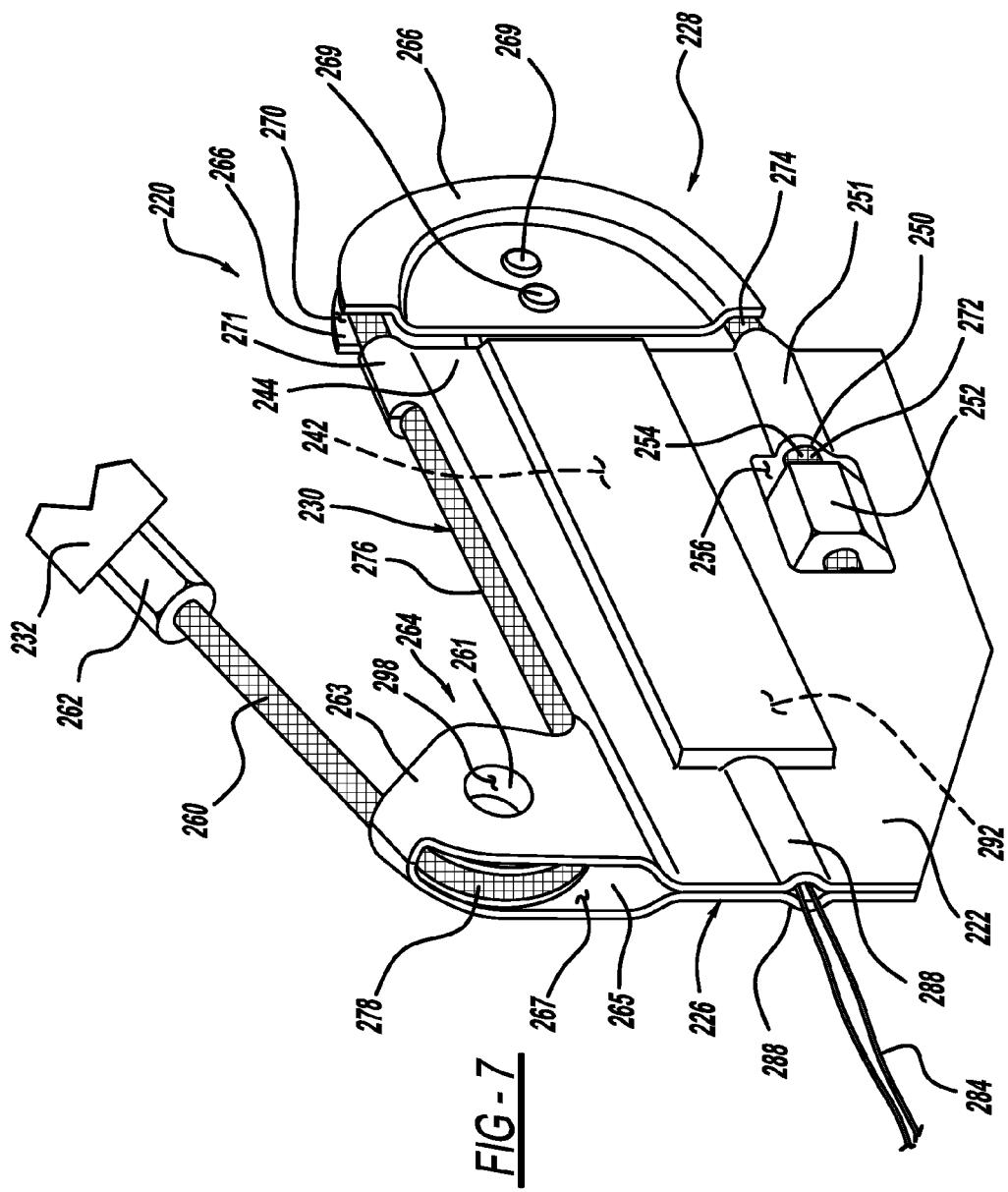
FIG. 7 is a perspective view of yet another embodiment of a pretensioner in accordance with the principles of the present invention.
Figure 8:
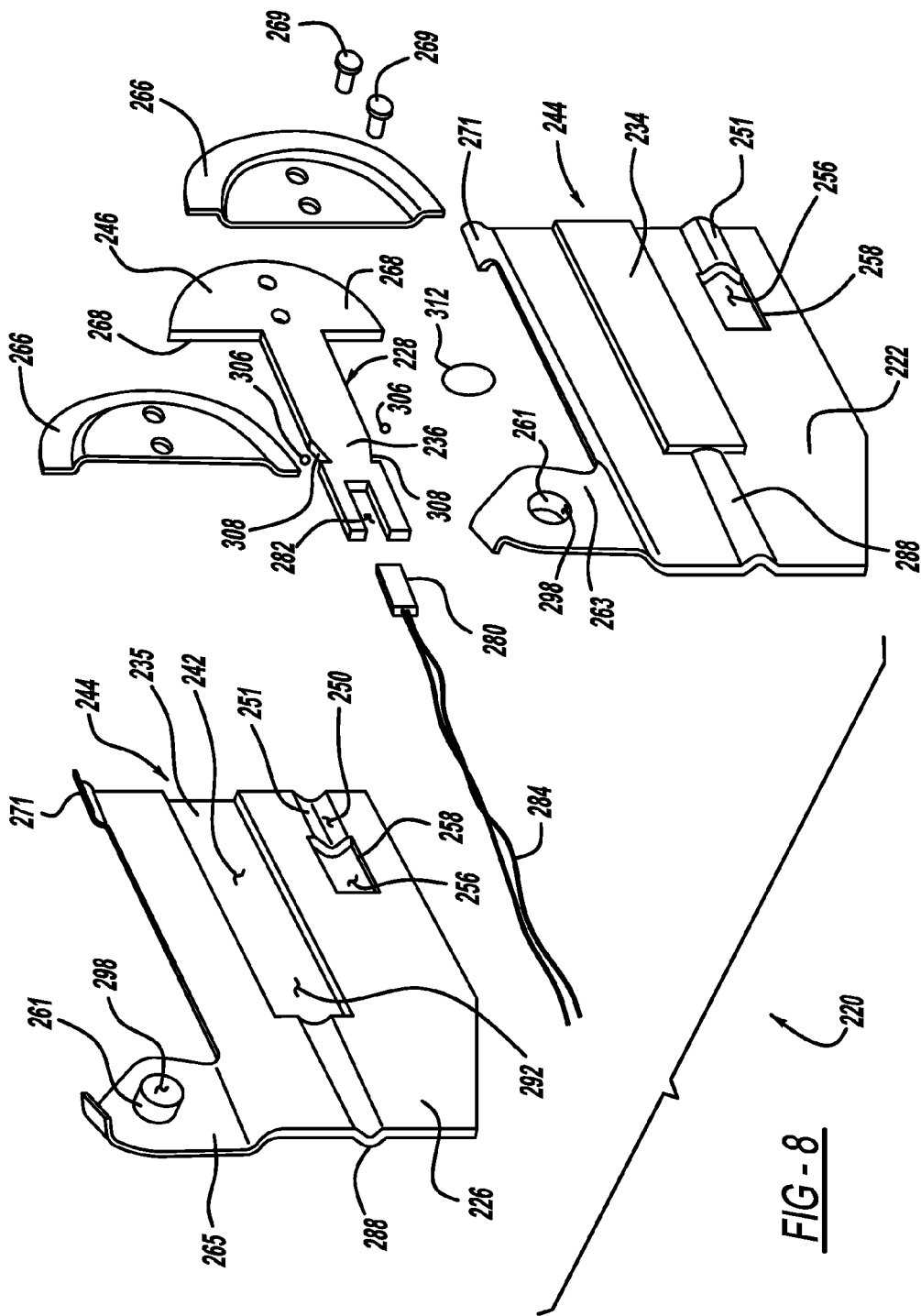
FIG. 8 is an exploded view of the pretensioner of FIG. 7.

Referring now to FIGS. 7-8, yet another example of a pretensioner is illustrated at 220. The pretensioner 220 shown in FIGS. 7-8 has a base plate 222, and a closure plate 226 attached to the base plate 222. The closure plate 226 is identical to the base plate 222, however, it should be understood that in some variations, the base plate 222 and closure plate 226 need not be identical. Each is formed of sheet metal stock, by way of example.

The base plate 222 has portions forming a slot 234, which is formed as an indentation stamped into the sheet metal stock of the base plate 222, in this embodiment. Likewise, the closure plate 226 has an identical slot 235 stamped into it. When the base plate 222 and the closure plate 226 are attached together, the slots 234 and 235 of the base plate 222 and the closure plate 226 are disposed adjacent to one another to form a cavity 242 having an open end 244.

Like the pretensioners 20, 120 described above, the pretensioner 220 includes a piston plate 228 having a piston head 246 and a piston tail 236. The cavity 242 formed by the opposing slots 234 and 235 of the base plate 222 and closure plate 226 telescopically overfits the piston tail 236. The piston head 246 extends from the open end 244 of the cavity 242.

Similar to the pretensioners described above, the pretensioner 220 of FIGS. 7-8 has a flexible cable 230 coupled to the base plate 222 and the closure plate 226. The cable 230 extends through a narrow passageway 250 formed by indentations 251 in the base plate 222 and the closure plate 226, and the end 254 of the cable 230 is secured to a cable stop 252. The cable stop 252 is larger than the narrow passageway 250 to prevent the cable 230 and cable stop 252 from retracting back through the narrow passageway 250, which retains the cable 230 to the base plate 222 and the closure plate 226 when the base plate 222 and the closure plate 226 are attached together. The cable stop 252 resides in a larger passageway 256, which is larger than the narrow passageway 250, within each of the base plate 222 and closure plate 256. The base plate 222 and closure plate 226 may have cut-outs 258 (and/or indentations (not shown)) to give the cable stop 252 space to extend in front and rear directions from the base plate 222 and closure plate 226.

At its other end 260, the cable 230 is secured to the belt restraint component 232. Another cable stop 262 could be used to attach the cable 230 to the belt restraint component 232. The cable 230 extends from the larger passageway 256 in the base plate 222 and closure plate 226, around the semi-circular shaped piston head 246, further around a guide feature 264 and to the belt restraint component 232. When the pretensioner 220 is installed into position within a vehicle, the cable 230 is in slidable contact with the piston head 246. A pair of cable guides 266 are disposed on opposite sides 268, or opposite faces, of the piston head 246, for example, by fasteners 269. The pair of cable guides 166 form a channel 270 therebetween, and the cable 230 is disposed within the channel 270.

A distal end portion 272 of the cable 230 is coupled to the base plate 222 and closure plate. The distal end portion 272 is routed generally parallel to the piston tail 236 of the piston plate 228, the slots 234 and 235 and the cavity 242 formed by the slots 234, 235. An intermediate portion 274 of the cable 230 is connected to the distal end portion 272, and the intermediate portion 274 is routed around the semi-circular piston head 246 180° within the channel 270 between the cable guides 266. A proximal end portion 276 of the cable 230 is connected to the intermediate portion 274. The proximal end portion 276 is routed generally parallel to the piston tail 236 of the piston plate 228, the slots 234 and 235, the cavity 242, and the distal end portion 272. A guide 271 may assist with guiding the proximal end portion 274 of the cable 230 to be parallel to the piston tail 236, the slots 234 and 235, the cavity 242, and the distal end portion 272.

The proximal end portion 276 is further connected to a restraint portion 278 of the cable 230. The restraint portion 278 is routed around the guide feature 264 and coupled with the belt restraint system component 232. The function of the guide feature 264 is similar to the function of the guide features 64 and 164 described above. In this embodiment, the guide feature 264 is formed of front and back guide features 263 and 265. The front guide feature 263 extends from the base plate 222 and the back guide feature 265 extends from the closure plate 226. Each of the front and back guide features 263 and 265 includes a round middle portion 261 that forms one half of a stationary pulley. In some embodiments, an annular bearing (not shown) could be placed around the round middle portions 261 to form a non-stationary pulley. The front and back guide features 263 and 265 cooperate to form a channel 267 through which the cable 230 is routed. The cable 230 extends through the channel 267 from the piston head 246 to the cable stop 262 and belt restraint system component 232. It should be understood that the guide feature 264 could alternatively be provided with other configurations, such as a detached guide 64 described above with respect to FIGS. 1-3, by way of example.

The pretensioner 220 further includes a gas generator 280 in fluid communication with the cavity 242, as described above with respect to FIGS. 1-6. Firing lines 284 extend from the gas generator 280, and they may be routed in any suitable manner, such as those described above. For example, the base plate 222 and closure plate 226 could each have wire reliefs, such as indentations 288. It should be understood that the gas generator 280 could alternatively be located, such as in the base plate 222 and/or the closure plate 226.

The cavity 242 and the piston tail 236 form an expanding chamber 292 that enlarges when pressurized by the gas generator 280. Upon activation, the gas generator 280 pressurizes the expanding chamber 292, which causes it to expand and drive the piston plate 228 and the base plate 222 relative to each other in a linear direction. When the gas generator 280 drives the piston plate 128 with respect to the base plate 222, the cable 230 slides around the piston head 246 and around the guide feature 264, and tension is exerted on the cable 230. The belt restraint system component 232 is pulled and the seat belt restraint system is pretensioned.

As described above with respect to FIGS. 1-3, either the piston plate 228 or the base plate 222 and closure plate 226 may be adapted to be fixed to the motor vehicle structure. The base plate 222 and closure plate 226 may be fixed to the vehicle structure using a fastener inserted through bores 298 and/or flanges formed within the guide feature 264, or any other suitable means, by way of example.

When the base plate 222 and closure plate 226 are fixed to motor vehicle structure, the piston tail 236 of the piston plate 228 is configured to advance within the expanding chamber 292 upon activation of the gas generator 280, while the base plate 222 and closure plate 226 remain stationary. This causes the piston head 246 to push the intermediate portion 274 of the cable 230 outward and the cable 230 to slide around the piston head 246. The parallel distal end portion 272 and proximal end portion 276 of the cable 230 each advance. As in prior embodiments, when the piston tail 236 travels within the cavity 242, the restraint portion 278 of the cable 230 and the belt restraint system component 232 are displaced twice as far as the piston 228 moves.

In another embodiment, the piston plate 228 is adapted to be fixed to the motor vehicle structure and remain stationary upon deployment of the gas generator 280, and the base plate 222 and closure plate 226 are configured to be driven and slide along the piston tail 236 upon deployment of the gas generator 280. This causes the base plate 222 and closure plate 226 to pull the cable 230 in a sliding motion around the piston head 246. The parallel distal end portion 272 and proximal end portion 276 of the cable 230 each advance.

As described above with respect to FIGS. 1-6, the pretensioner 220 may be provided with a one-way clutch to prevent the piston plate 228, or the base plate 222 and closure plate 226, from moving in a reverse direction after actuation. The one-way clutch may include a pair of balls 306 loaded into position within triangular cut-outs 308 in the piston tail 236. In addition, one or more seals 312 for gas retention may be positioned around the exterior side of the piston tail 236, as described above.

Figure 9:
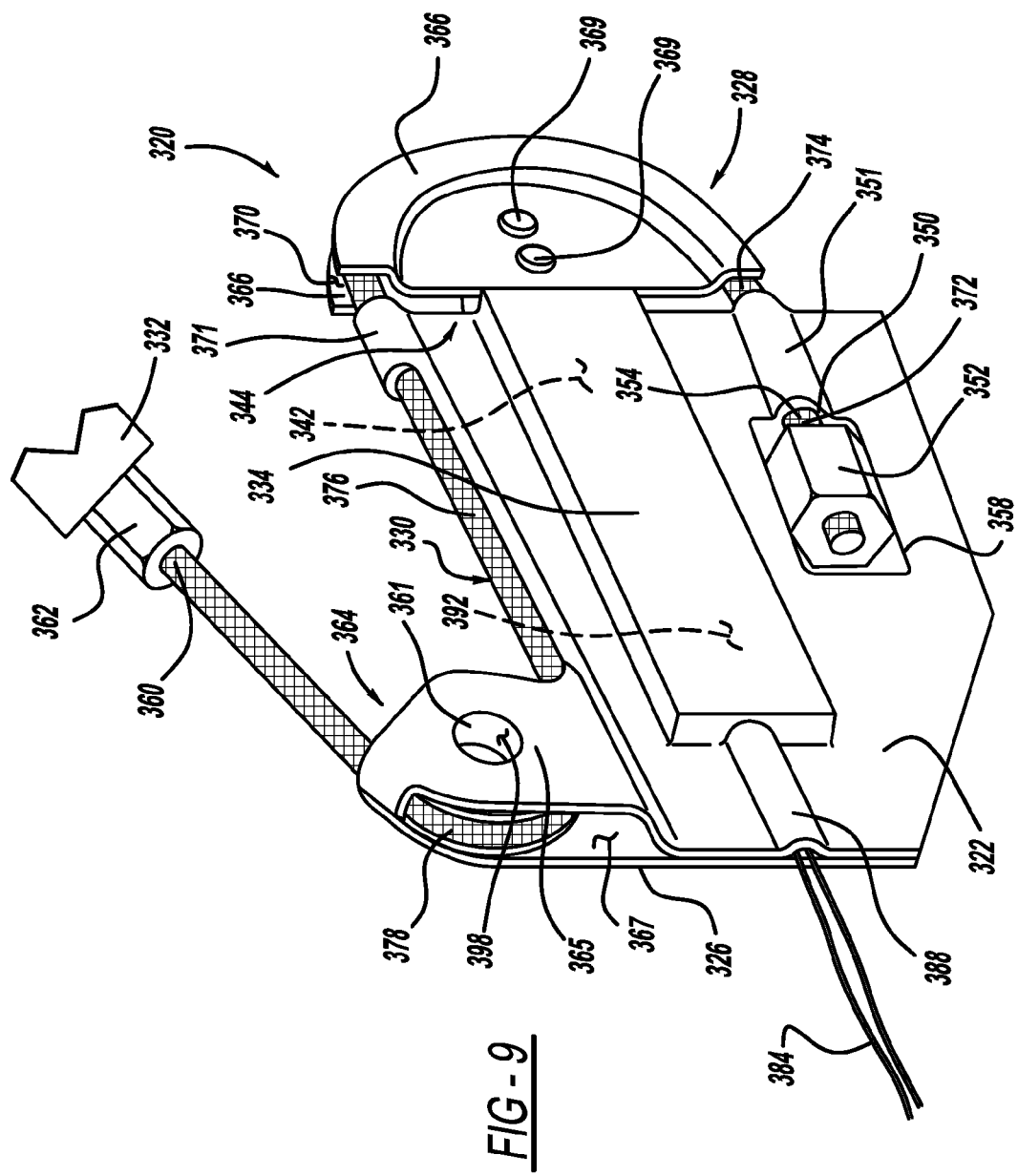
FIG. 9 is a perspective view of still another embodiment of a pretensioner in accordance with the principles of the present invention.
Figure 10:
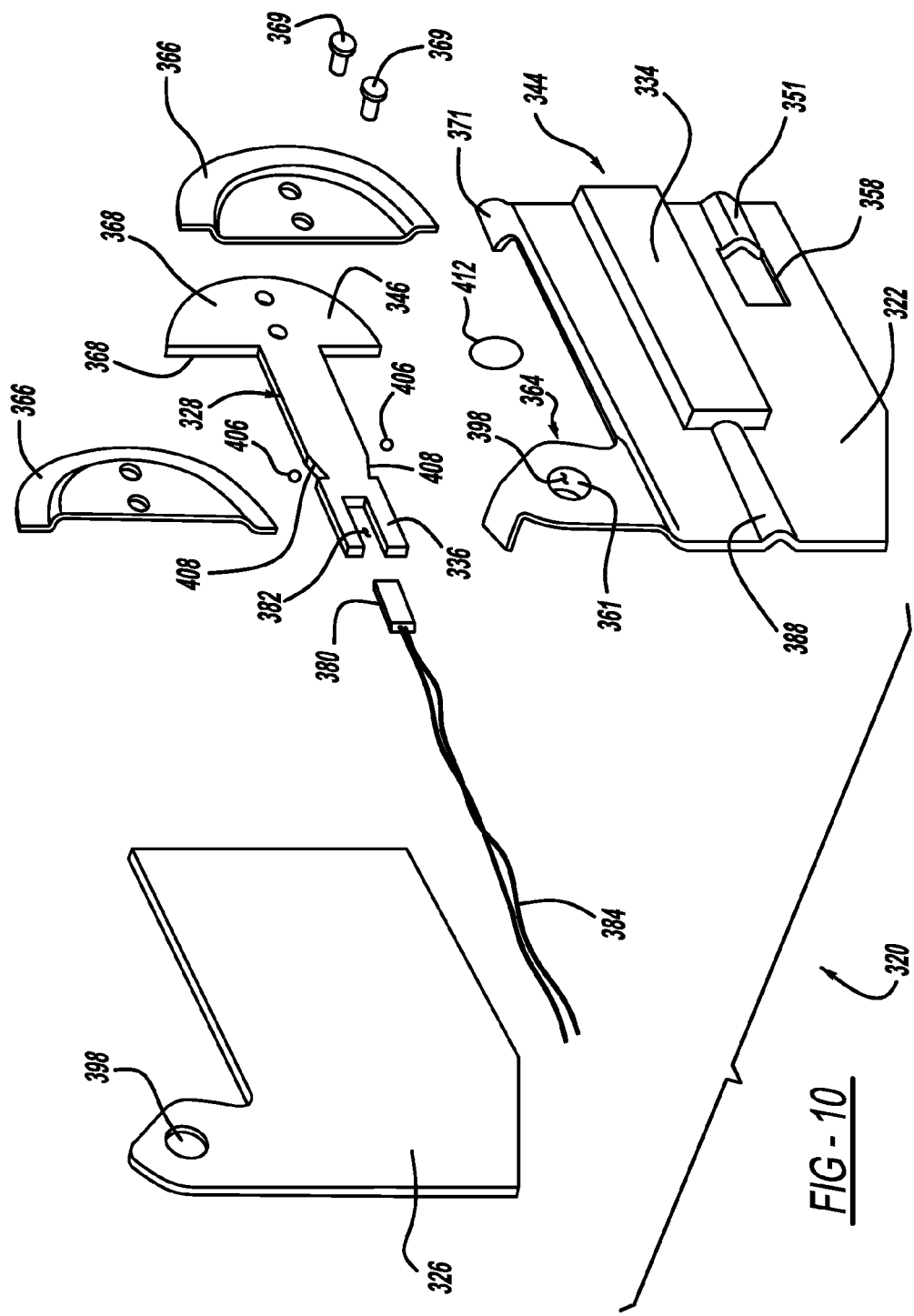
FIG. 10 is an exploded view of the pretensioner of FIG. 9.

Referring now to FIGS. 9-10, still another example of a pretensioner is illustrated at 320. The pretensioner 320 has many similarities to the pretensioners 20, 120, and 220 hereinbefore described, especially the pretensioner 220 shown in FIGS. 7-8, and the discussions above with respect to those pretensioners is incorporated by reference here.

The pretensioner 320 of FIGS. 9-10 has a base plate 322, and a closure plate 326 attached to the base plate 322. Each of the base plate 322 and the closure plate 326 may be formed of sheet metal stock. The base plate 322 has portions forming a slot 334, which may be formed as an indentation stamped into the sheet metal stock of the base plate 322, in this embodiment. The closure plate 326 is substantially flat along the entirety of its surface.

The closure plate 326 is fixedly attached to the base plate 322, by any suitable means such as those described above. Although bores for fasteners are not shown, it should be understood that the base plate 322 and closure plate 326 could be formed or stamped to have such bores, if desired. When the closure plate 326 is fixed to the base plate 322, the slot 334 and adjacent flat wall of the closure plate 326 form a cavity 342 having an open end 344.

Like the pretensioners 20, 120, and 220 described above, the pretensioner 320 includes a piston plate 328 having a piston head 346 and a piston tail 336. The cavity 342 formed by the slot 334 and adjacent flat wall of the closure plate 226 telescopically overfits the piston tail 336. The piston head 346 extends from the open end 344 of the cavity 342.

Similar to the pretensioners described above, the pretensioner 320 of FIGS. 9-10 has a flexible cable 330 coupled to the base plate 322 and the closure plate 326. The cable 330 extends through a narrow passageway 350 formed by an indentation 351 in the base plate 322 and the adjacent flat wall of the closure plate 326, and the end 354 of the cable 330 is secured to a cable stop 352. The cable stop 352 is larger than the narrow passageway 350, which traps the cable 330 and therefore retains the cable 330 to the base plate 322 and the closure plate 326 when the base plate 322 and the closure plate 326 are attached together. The base plate 322 may have a cut-out 358 (and/or indentations (not shown)) to give the cable stop 352 space to extend in a front direction from the base plate 322.

At its other end 360, the cable 330 is secured to the belt restraint component 332. Another cable stop 362 could be used to attach the cable 330 to the belt restraint component 332. The cable 330 extends from the cut-out 358 in the base plate 322, around the semi-circular shaped piston head 346, further around a guide feature 364 and to the belt restraint component 332. When the pretensioner 320 is installed into position within a vehicle, the cable 330 is in slidable contact with the piston head 346. A pair of cable guides 366 are disposed on opposite sides 368, or opposite faces, of the piston head 346, for example, by fasteners 369. The pair of cable guides 366 form a channel 370 therebetween, and the cable 330 is disposed within the channel 370.

A distal end portion 372 of the cable 330 is coupled to the base plate 322 and closure plate 326. The distal end portion 372 is routed generally parallel to the piston tail 336 of the piston plate 328, the slots 334, and the cavity 342 formed by the slot 334 and flat surface of the closure plate 326. An intermediate portion 374 of the cable 330 is connected to the distal end portion 372, and the intermediate portion 374 is routed around the semi-circular piston head 346 180° within the channel 370 between the cable guides 366. A proximal end portion 376 of the cable 330 is connected to the intermediate portion 374. The proximal end portion 376 is routed generally parallel to the piston tail 336 of the piston plate 328, the slot 334, the cavity 342, and the distal end portion 372. A guide 371 may assist with guiding the proximal end portion 374 of the cable 330 parallel to the piston tail 336, the slot 334, the cavity 342, and the distal end portion 372.

The proximal end portion 376 is further connected to a restraint portion 378 of the cable 330, which is routed around the guide feature 364 and coupled with the belt restraint system component 332. The function and configuration of the guide feature 364 is similar to the function of the guide features 64, 164, and 264 described above.

In this embodiment, the guide feature 364 is formed on a cantilevered guide portion 365 of the base plate 322. The cantilevered guide portion 365 cooperates with the flat surface of the adjacent closure plate 326 to form the guide feature 322. It should be understood, however, that other configurations of the guide feature 364 could be used; for example, the guide feature 364 could include a separate guide piece, such as the guide feature 64 of FIGS. 1-3. The guide feature 364 includes a round middle portion 361 that forms a stationary pulley. In some embodiments, an annular bearing (not shown) could be placed around the round middle portions 361 to form a non-stationary pulley. The guide feature 364 cooperates with the flat wall of the closure plate 326 to form a channel 367 through which the cable 330 is routed. The cable 330 extends through the channel 367 from the piston head 346 to the cable stop 362 and belt restraint system component 332.

The pretensioner 320 may further include a gas generator 380 in fluid communication with the cavity 342, as described above with respect to FIGS. 1-8. Firing lines 384 extend from the gas generator 380, and they may be routed in any suitable manner, such as those described above. For example, the base plate 322 (and/or the closure plate 326) could have a wire relief, such as an indentation 388, which could be filed with a suitable compound to prevent leakage, as described above. It should be understood that the gas generator 380 could alternatively be located, such as in the base plate 322 and/or the closure plate 326.

The cavity 342 and the piston tail 336 form an expanding chamber 392 that enlarges when pressurized by the gas generator 380. Upon activation, the gas generator 380 pressurizes the expanding chamber 392, which causes it to expand and drive the piston plate 328 and the base plate 322 relative to each other in a linear direction. When the gas generator 380 drives the piston plate 328 with respect to the base plate 322, the cable 330 slides around the piston head 346 and around the guide feature 364, and tension is exerted on the cable 330. The belt restraint system component 332 is pulled and the seat belt restraint system is pretensioned.

As described above with respect to FIGS. 1-3 and 7-8, either the piston plate 328 or the base plate 322 and closure plate 326 may be adapted to be fixed to the motor vehicle structure. The base plate 322 and closure plate 326 may be fixed to the vehicle structure using a fastener inserted through bores 398 and/or flanges formed within the guide feature 364, or any other suitable means, by way of example.

When the base plate 322 and closure plate 326 are fixed to motor vehicle structure, the piston tail 336 of the piston plate 328 is configured to advance within the expanding chamber 392 upon activation of the gas generator 380, while the base plate 322 and closure plate 326 remain stationary. In the alternative, the piston plate 328 is fixed to vehicle structure and the base plate 322 and closure plate 326 stroke along the piston tail 336 while the piston plate 328 remains stationary. Either way, the intermediate portion 374 of the cable 330 slides around the piston head 346 as described above. The parallel distal end portion 372 and proximal end portion 376 of the cable 330 each advance upon actuation of the gas generator 380. As in prior embodiments, when either the piston tail 336 or the base plate 322 travels, the restraint portion 378 of the cable 330 and the belt restraint system component 332 are displaced twice as far as the piston 328 or the base plate 322 moves, as described above.

As described above with respect to FIGS. 1-8, the pretensioner 320 may be provided with a one-way clutch to prevent the piston plate 328, or the base plate 322 and closure plate 326, from moving in a reverse direction after actuation. The one-way clutch may include a pair of balls 406 loaded into position within triangular cut-outs 408 in the piston tail 436. In addition, one or more seals 412 for gas retention may be positioned around the exterior side of the piston tail 436, as described above.

While the above description contains examples of the present invention, it will be appreciated that the invention is susceptible to modification, variation, and change without departing from the proper scope and fair meaning of the accompanying claims. For example, any combination of the embodiments described above may be utilized, and features of one embodiment may be incorporated with another.

The present disclosure is merely exemplary in nature and, thus, variations that do not depart from the gist of the disclosure are intended to be within the scope of the present disclosure. Such variations are not to be regarded as a departure from the spirit and scope of the present disclosure.

The invention claimed is:

1. A linear pretensioner for use as part of a motor vehicle occupant belt restraint system of the type mountable to a motor vehicle structure and coupled with a belt restraint system component, and upon being activated, pulls the belt restraint system component to pretension the belt restraint system, the linear pretensioner comprising:

at least one base plate having portions forming a slot;

at least one closure plate fixedly attached to the at least one base plate, the at least one closure plate and the portions of the at least one base plate cooperating to form a cavity having an open end;

a generally flat piston plate having a piston tail slidably disposed within the cavity and a piston head extending from the open end; and a cable coupled with at least one of the piston plate, the at least one base plate, or the at least one closure plate, wherein the piston plate, the portions of the at least one base plate forming the slot, and the at least one closure plate cooperate to form an expanding chamber that enlarges when pressurized by gas from a gas generator, wherein upon activation of the gas generator, the gas drives the piston plate and the at least one base plate relative to each other in a linear direction to exert tension on the cable.

2. The linear pretensioner in accordance with claim 1, the cable being further coupled with the belt restraint system component, the cable being routed around the piston head in slidable contact therewith.

3. The linear pretensioner in accordance with claim 2, further comprising a pair of cable guides disposed on opposite sides of the piston head, the pair of cable guides forming a channel therebetween, the cable being disposed within the channel.

4. The linear pretensioner in accordance with claim 2, wherein upon activation of the gas generator, the piston plate travels a distance X and the belt restraint system component is displaced a distance 2X.

5. The linear pretensioner in accordance with claim 2, wherein the cable is located entirely outside of the expanding chamber.

6. The linear pretensioner in accordance with claim 2, the slot of the at least one base plate being formed as an indentation, the at least one closure plate being formed substantially identical to the at least one base plate, including being formed with an indented closure plate slot, the closure plate slot being disposed adjacent to the slot of the at least one base plate to form the cavity.

7. The linear pretensioner of claim 6, the at least one closure plate and the at least one base plate being formed of stamped sheet metal stock.

8. The linear pretensioner in accordance with claim 6, further comprising a pair of cable guides disposed on opposite sides of the piston head, the pair of cable guides forming a channel therebetween, the cable being disposed within the channel.

9. The linear pretensioner in accordance with claim 6, wherein the cable comprising:

a distal end portion coupled to the at least one base plate, the distal end portion routed generally parallel to the piston tail and the cavity;

an intermediate portion connected to the distal end portion, the intermediate portion routed around the piston head; and a proximal end portion connected to the intermediate portion, the proximal end portion routed generally parallel to the piston tail, the cavity, and the distal end portion.

10. The linear pretensioner in accordance with claim 9, wherein upon activation of the gas generator, the piston plate travels a distance X and the belt restraint system component is displaced a distance 2X.

11. The linear pretensioner in accordance with claim 6, the piston plate forming a recess within the piston tail, the recess being disposed within the cavity, the gas generator disposed within the recess.

12. The linear pretensioner in accordance with claim 6, further comprising at least one guide feature extending from at least one of the at least one base plate and the at least one closure plate, the guide feature forming a channel through which the cable passes.

13. The linear pretensioner in accordance with claim 6, wherein the at least one base plate is adapted to be fixed to the motor vehicle structure and wherein the piston plate is configured to advance within the expanding chamber upon activation of the gas generator while the at least one base plate remains stationary.

14. The linear pretensioner in accordance with claim 2, the slot being formed as an indentation in the at least one base plate, the at least one closure plate being formed of sheet metal stock and being substantially flat along the entirety of its surface.

15. The linear pretensioner in accordance with claim 14, the at least one base plate being formed by stamping sheet metal stock.

16. The linear pretensioner in accordance with claim 14, further comprising a pair of cable guides disposed on opposite sides of the piston head, the pair of cable guides forming a channel therebetween, the cable being disposed within the channel.

17. The linear pretensioner in accordance with claim 16, wherein the cable comprising:

a distal end portion coupled to the at least one base plate, the distal end portion routed generally parallel to the piston tail and the cavity;

an intermediate portion connected to the distal end portion, the intermediate portion routed around the piston head; and a proximal end portion connected to the intermediate portion, the proximal end portion routed generally parallel to the piston tail, the cavity, and the distal end portion.

18. The linear pretensioner in accordance with claim 17, wherein upon activation of the gas generator, the piston plate travels a distance X and the belt restraint system component is displaced a distance 2X.

19. The linear pretensioner in accordance with claim 14, the piston plate forming a recess within the piston tail, the recess being disposed within the cavity, the linear pretensioner further comprising the gas generator disposed within the recess.

20. The linear pretensioner in accordance with claim 14, wherein the at least one base plate is adapted to be fixed to the motor vehicle structure and wherein the piston plate is configured to advance within the expanding chamber upon activation of the gas generator while the at least one base plate remains stationary.

21. The linear pretensioner in accordance with claim 1, further comprising the at least one closure plate including a front closure plate and a back closure plate, the front closure plate fixedly attached to a front side of the at least one base plate and the back closure plate fixedly attached to a back side of the at least one base plate.

22. The linear pretensioner in accordance with claim 21, wherein the cable comprising:

a distal end portion coupled to the at least one base plate, the distal end portion routed generally parallel to the piston tail and the cavity;

an intermediate portion connected to the distal end portion, the intermediate portion routed around the piston head; and a proximal end portion connected to the intermediate portion, the proximal end portion routed generally parallel to the piston tail, the cavity, and the distal end portion.

23. The linear pretensioner in accordance with claim 21, further comprising a guide feature attached to at least one of the front and back closure plates, a proximal end portion of the cable being connected to a restraint portion of the cable, the guide feature forming a channel through which the restraint portion of the cable is routed, the restraint portion of the cable being coupled with the belt restraint system component.

24. The linear pretensioner in accordance with claim 23, further comprising seat belt webbing coupled with the cable, the seat belt webbing defining a webbing width, wherein the at least one base plate, the front and the back closure plates, the guide feature, the piston plate, and the cable define a pretensioner width, the pretensioner width not exceeding twice the webbing width.

25. The linear pretensioner in accordance with claim 21, wherein the front and the back closure plates are adapted to be fixed to the motor vehicle structure and wherein the piston plate is configured to advance within the expanding chamber upon activation of the gas generator while the front and the back closure plates and the at least one base plate remain stationary.

26. The linear pretensioner in accordance with claim 21, wherein the piston plate is adapted to be fixed to the motor vehicle structure and wherein the front and the back closure plates and the at least one base plate are driven along the piston tail upon activation of the gas generator while the piston plate remains stationary.

27. The linear pretensioner in accordance with claim 1 wherein at least one of the at least one base plate, the at least one closure plate and the piston plate are formed of sheet metal stock.

28. The linear pretensioner in accordance with claim 1, wherein the at least one closure plate, the at least one base plate, and the piston plate are formed of sheet metal stock.

29. The linear pretensioner in accordance with claim 1, the piston plate forming a recess within the piston tail, the recess being disposed within the cavity.

30. The linear pretensioner in accordance with claim 29, further comprising the gas generator disposed within the recess of the piston tail.

31. The linear pretensioner in accordance with claim 1, further comprising seat belt webbing coupled with the cable, the seat belt webbing defining a webbing width, wherein the at least one base plate, the at least one closure plate, the piston plate, and the cable define a pretensioner width, the pretensioner width not exceeding twice the webbing width.

32. The linear pretensioner in accordance with claim 1 wherein the cavity being bounded by the at least one base plate and the at least one closure plate.

33. The linear pretensioner in accordance with claim 1 wherein the cavity being bounded by the at least one base plate and a pair of the at least one closure plates.

34. The linear pretensioner in accordance with claim 1 wherein the cavity being rectangular in cross section viewed transverse to the direction of movement of the piston plate relative to the at least one base plate.

35. The linear pretensioner in accordance with claim 34 wherein the cavity rectangular cross-section having a height (H) which is at least three times the width (W).

* * * * *